(12) United States Patent
Doh

(10) Patent No.: US 6,853,901 B2
(45) Date of Patent: Feb. 8, 2005

(54) SAFETY MODE CONTROL METHOD FOR A FOUR WHEEL DRIVE VEHICLE

(75) Inventor: Gyu-Chull Doh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/465,904

(22) Filed: Jun. 18, 2003

(65) Prior Publication Data

US 2004/0049332 A1 Mar. 11, 2004

(30) Foreign Application Priority Data

Sep. 10, 2002 (KR) .................................. 10-2002-0054665

(51) Int. Cl.$^7$ ................................................ G06F 7/00
(52) U.S. Cl. ........................... 701/67; 701/68; 701/81; 192/3.56; 192/53.2; 192/56.4; 477/174; 477/176; 477/180
(58) Field of Search ............................. 701/76, 67–69, 701/81–82, 89; 192/3.23, 3.25, 3.28, 3.31, 3.32, 3.54, 3.55, 3.56, 103 R, 3.58, 53.1, 53.2, 56.4, 56.41; 477/166, 174–177, 180; 180/197, 233, 248–250

(56) References Cited

U.S. PATENT DOCUMENTS

| 4,660,697 A | * | 4/1987 | Yoneda et al. .............. 477/175 |
| 4,867,287 A | * | 9/1989 | Hayashi ..................... 192/21.5 |
| 4,937,750 A | * | 6/1990 | Gilliam ........................ 701/69 |
| 4,989,686 A |   | 2/1991 | Miller et al. ................ 180/197 |
| 5,016,724 A |   | 5/1991 | Steinhagen et al. ......... 180/197 |
| 5,247,443 A | * | 9/1993 | Gilliam ........................ 701/81 |
| 5,487,596 A |   | 1/1996 | Negrin ........................ 303/143 |
| 5,979,584 A | * | 11/1999 | Glab et al. .................. 180/249 |
| 6,050,655 A |   | 4/2000 | Naito et al. ................. 303/173 |
| 6,568,256 B1 | * | 5/2003 | Lee ........................... 73/118.1 |

* cited by examiner

Primary Examiner—Jacques H. Louis-Jacques
(74) Attorney, Agent, or Firm—Morgan Lewis & Bockius LLP

(57) ABSTRACT

A method for controlling the safety mode of a four-wheel drive to control the magnetic clutch at a safety mode duty to reduce overload for a predetermined period of time when the slip of the magnetic clutch is greater than an allowable slip, despite controlling the magnetic clutch at its maximum duty.

9 Claims, 1 Drawing Sheet

SAFETY MODE CONTROL METHOD FOR A FOUR WHEEL DRIVE VEHICLE

FIELD OF THE INVENTION

The present invention relates to a control method for a four-wheel drive vehicle and, more particularly, to a method for controlling overload in the magnetic clutch of a four-wheel drive vehicle.

BACKGROUND OF THE INVENTION

In general, when four-wheel drive is engaged, a control unit checks the sensors and actuator. If there is nothing wrong, a front speed sensor detects the speed of the driving axle that supplies power from the engine to a magnetic clutch. A rear speed sensor detects the speed of a driven axle to which power is conveyed from the driving axle through the magnetic clutch. A comparison is made as to whether the rotational speed of the driving axle sensed by the front speed sensor is greater than that of the driven axle sensed by the rear speed sensor.

If the speed of the driving axle is not greater than that of the driven axle, a comparison is made as to whether the rotating speed of the driven axle is larger than that of the driving axle. If the speed of the driving axle is greater than that of the driven axle and if the speed of the driven axle is greater than that of the driving axle, the control unit appropriately adjusts the magnetic clutch slip to less than a predetermined level of allowable slip and adequately supplies power from the driving axle to the driven axle, thereby actuating the four-wheel drive.

However, there are drawbacks in conventional control methods for four-wheel drive. When the magnetic clutch of the vehicle is overloaded, there may be a big difference in the rotational speed of the driving and driven axles, even if the magnetic clutch is controlled at its maximum duty, thereby causing continuous excessive slip and bringing about burning due to overheating of the magnetic clutch.

SUMMARY OF THE INVENTION

The present invention provides a safety mode control method for four-wheel drive vehicles to prevent a magnetic clutch from being burnt by the slip of the magnetic clutch due to overload. In accordance with one embodiment of the present invention, it is determined whether the slip of the magnetic clutch is greater than the permissible slip when the magnetic clutch is controlled at its maximum duty. It is then determined whether a first cumulative time, the period of time where the magnetic clutch is controlled at its maximum duty and the slip is greater than the allowable slip, is greater than a first reference time. The magnetic clutch is controlled at its safety mode duty if the first cumulative time is greater than the first reference time. It is also determined whether a second cumulative time, the period of time of continuously controlling the magnetic clutch at its safety mode duty, is greater than a second reference time. The magnetic clutch is then controlled at its safety mode release duty and returning it to its normal control routine state if the second cumulative time is greater than the second reference time.

In a further alternative embodiment, the present invention comprises a method for controlling a four-wheel drive magnetic clutch at a safety mode duty and a safety mode release duty under appropriate conditions. Initially, duty is controlled according to a normal control routine. Determinations are made as to whether the clutch is controlled at maximum duty and whether clutch slip exceeds a permissible slip if the clutch is controlled at maximum duty. When these conditions occur, a first period of time at which the clutch is controlled at maximum duty with slip exceeding permissible slip is counted. The clutch is then controlled at the safety mode duty when the first period exceeds a first reference time. A second period of time is then counted at which the clutch is controlled at the safety mode duty. Control is switched to the safety mode release duty when the second period of time exceeds a second reference time.

Preferably, the first reference time corresponds to a time that the clutch may be overloaded without sustaining damage and the second reference time corresponds to a time required for the clutch to return to a normal state from an overloaded state. In a further preferred embodiment, the safely mode release duty comprises a gradual change in duty from safety mode duty to normal control routine duty. Control is then returned to the normal control routine after controlling at the safety mode release duty.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
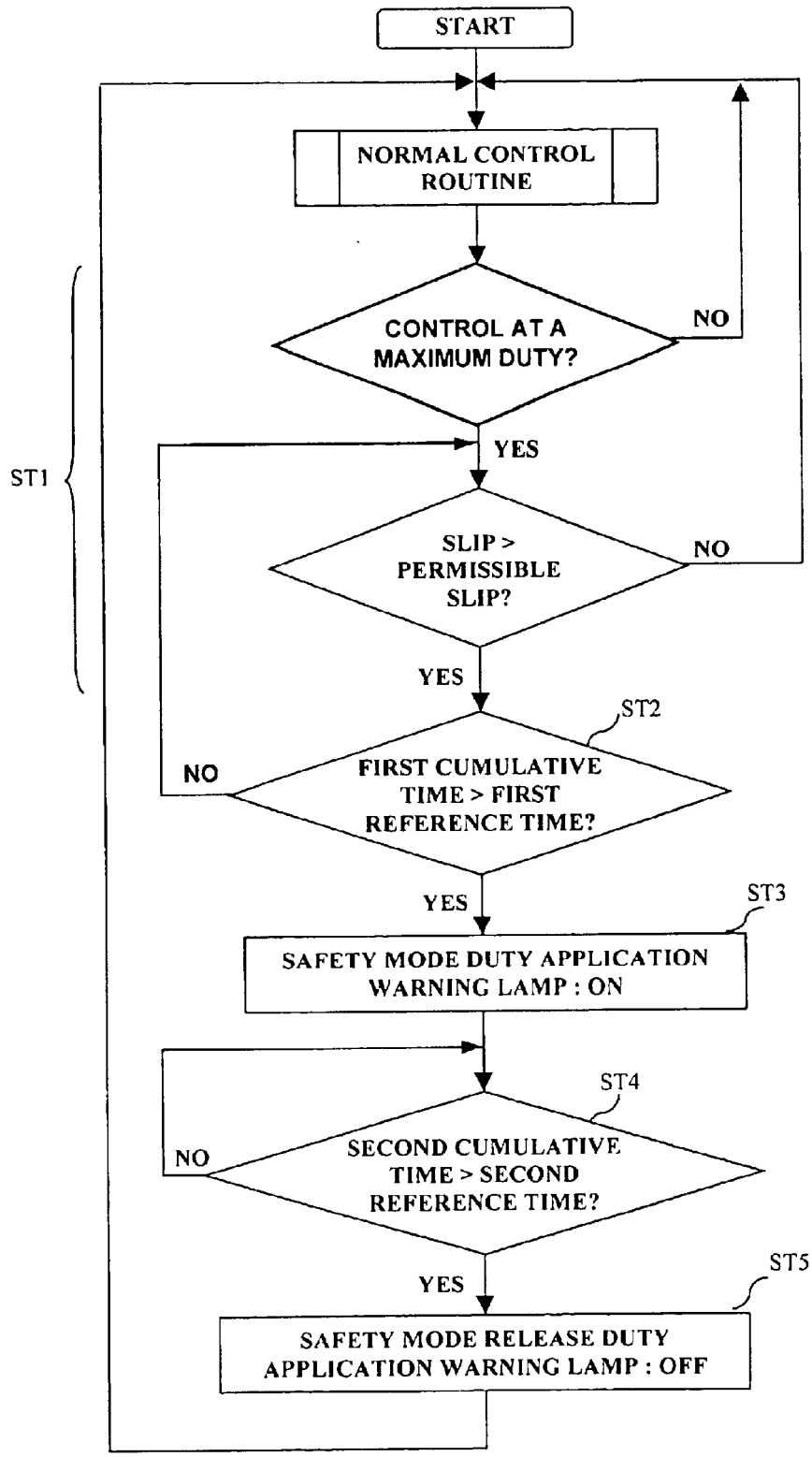
FIG. 1 is a flowchart illustrating an embodiment of the present invention.

Referring to FIG. 1, in the case of a four-wheel drive in a normal control routine state, a front speed sensor detects the rotational speed of a driving axle that supplies power from an engine to a magnetic clutch. A rear speed sensor detects the rotational speed of a driven axle to which power is supplied from the driving axle through the magnetic clutch. After the detected rotational speeds are compared, the control unit appropriately controls the magnetic clutch by a proper duty according to the difference between the rotational speeds to maintain a state where the slip of the magnetic clutch is smaller than the allowable slip, thereby properly supplying the power needed to drive the four-wheel drive.

Next, it is determined whether the slip of the magnetic clutch is greater than a known permissible slip (ST1). In other words, even if the magnetic clutch is controlled at its maximum duty, if the slip of the magnetic clutch is greater than the permissible slip, it means that the magnetic clutch is overloaded. Therefore, it can be determined through step ST1 whether the magnetic clutch is overloaded.

If the slip does not exceed the permissible slip, control is returned to normal routine control. However, if slip does exceed permissible slip, a counter is initiated at step ST2. A first cumulative time is counted. The first cumulative time corresponds to a period of time that the magnetic clutch is controlled at its maximum duty and the slip is confirmed to be greater than the permissible slip. Counting continues until it is determined the first cumulative time is greater than a first reference time, corresponding to a period of time that the overloaded magnetic clutch may be sustained without any damage.

If the first cumulative time becomes greater than the first reference time, the magnetic clutch is controlled at a safety mode duty at step ST3. The safety mode duty means that the magnetic clutch can be operated safely without any damage, even if the slip of the magnetic clutch is greater than the allowable slip. The safety mode duty is typically a value near zero and may be obtained experimentally by a person skilled in the art based on the teachings of the present invention. When the magnetic clutch is operated at the safety mode duty due to overload as described above, a notification is sent to the driver. In a preferred embodiment of the present invention, the control of the magnetic clutch in the safety mode duty is notified with a dashboard warning lamp.

Once the clutch is operated in safety mode, a second cumulative time is counted at step ST4. The second cumulative time corresponds to the period of time of continuously controlling the magnetic clutch at the safety mode duty. The second cumulative time is compared to a second reference time, corresponding to a period of time that the magnetic clutch requires to return from the overloaded state to its normal state. If the second cumulative time is greater than the second reference time, the magnetic clutch is controlled at the safety mode release duty at step ST5 and returned to the normal control routine. The warning lamp also is turned off at step ST5 to release the warning of the driver.

The safety mode release duty is a duty value calculated to gradually change from the safety mode duty to a duty determined according to a difference in the rotational speed of the driving and driven axles at its normal control routine. The safety mode release duty secures a stable operational state of the magnetic clutch by preventing a drastic change in the duty when the magnetic clutch is moved from the safety mode to the normal control routine. The safety mode release duty also may be experimentally determined by a person skilled in the art based on the teachings of the present invention.

As described above, there is an advantage in the method for controlling the safety mode of a four-wheel drive in accordance with the present invention in that it can prevent the magnetic clutch from being damaged in spite of an excessive slip caused by overload.

What is claimed is:

1. A method for control of a four-wheel drive having a control routine controlling the duty of a magnetic clutch according to a difference in the rotational speed of driving and driven axles, the method comprising:

determining whether slip of the magnetic clutch is greater than a permissible slip in a case where the magnetic clutch is controlled at a maximum duty;

determining whether a first cumulative time corresponding to a period of time that the magnetic clutch is controlled at the maximum duty and that the slip is greater than the permissible slip, is greater than a first reference time;

controlling the magnetic clutch at a safety mode duty when the first cumulative time is greater than the first reference time;

determining whether a second cumulative time corresponding to a period of time of continuously controlling the magnetic clutch at the safety mode duty, is greater than a second reference time; and controlling the magnetic clutch at a safety mode release duty and returning to the normal control routine when the second cumulative time is greater than the second reference time.

2. The method as defined in claim 1, further comprising warning to a driver that the magnetic clutch is being controlled at the safety mode duty, and terminating the warning given to the driver when the safety mode release duty is initiated.

3. The method as defined in claim 2, wherein said warning comprises lighting a warning light.

4. The method as defined in claim 1, wherein the safety mode release duty is calculated to gradually change from the safety mode duty to a duty determined according to a difference in the rotational speed of the driving and driven axles at the normal control routine.

5. A method for controlling four-wheel drive magnetic clutch duty, comprising:

controlling duty according to a normal control routine;

determining whether the clutch is controlled at maximum duty;

determining whether clutch slip exceeds a permissible slip if the clutch is controlled at maximum duty;

counting a first period of time at which the clutch is controlled at maximum duty with slip exceeding permissible slip;

controlling the clutch at a safety mode duty when said first period exceeds a first reference time;

counting a second period of time at which the clutch is controlled at the safety mode duty; and controlling the clutch at a safety mode release duty when said second period of time exceeds a second reference time.

6. The method of claim 5, wherein said first reference time corresponds to a time that the clutch may be overloaded without sustaining damage.

7. The method of claim 5, wherein said second reference time corresponds to a time required for the clutch to return to a normal state from an overloaded state.

8. The method of claim 5, wherein said safety mode release duty comprises a gradual change in duty from safety mode duty to normal control routine duty.

9. The method of claim 8, wherein control is returned to the normal control routine after controlling at said safety mode release duty.

* * * * *